Patented Aug. 11, 1925.

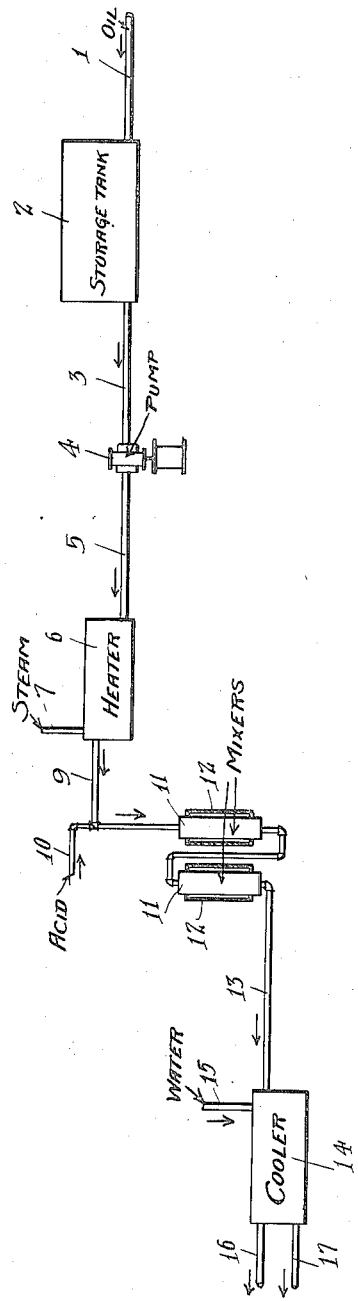

1,548,992

UNITED STATES PATENT OFFICE.

RICHARD W. HANNA AND JOSEPH F. BROOKS, OF RICHMOND, CALIFORNIA, ASSIGNORS TO STANDARD OIL COMPANY OF CALIFORNIA, OF SAN FRANCISCO, CALIFORNIA, A CORPORATION OF CALIFORNIA.

PROCESS OF REFINING PETROLEUM OILS FOR THE MANUFACTURE OF LAMP OILS.

Application filed January 20, 1920. Serial No. 352,813.

*To all whom it may concern:*

Be it known that we, RICHARD W. HANNA and JOSEPH F. BROOKS, citizens of the United States, residing at Richmond, in the county of Contra Costa and State of California, have invented a new and useful Process of Refining Petroleum Oils for the Manufacture of Lamp Oils, of which the following is a specification.

This invention relates to improvements in a process for refining petroleum oils for the manufacture of lamp oils. This process is particularly applicable for the refining of petroleum distillates which contain a high percentage of hydrocarbons of the carbocyclic series.

Our invention relates to a practically continuous process of purifying and refining petroleum distillates for the manufacture of lamp oils, in which there is removed from said distillate certain aromatic hydrocarbons, certain hydrocarbons which contain sulphur in chemical combination, certain hydrocarbons which contain nitrogen in chemical combination, and certain asphaltic hydrocarbons, by means of sulphuric acid and other refining fluids.

An object of our invention is to manufacture a lamp oil which will burn in any of the well known commercial forms of lamps or stoves, for lighting, heating or cooking purposes, and which will not give off an offensive odor, or burn with a smoky flame.

A further object of our invention is to refine lamp oil distillates to a standard commercial grade, using a smaller quantity of acid than by the well known methods.

Another object of our invention is to provide a method of refining lamp oil distillates by a continuous process, wherein the acid sludge and treated oil is continuously removed so that the water formed by the reaction of the oil and acid does not dilute and decrease the strength of the incoming acid.

This invention provides a continuous, time-saving method of refining, a saving in the amount of acid necessary to obtain the required grade of oil, a means of commingling hydrocarbon oils and sulphuric acid or other refining agents, without the use of air, paddles, or similar appliance.

It has heretofore been customary to treat that fraction of oil obtained in the distillation process of petroleum which is commonly known as lamp oil distillates with sulphuric acid in such quantities and of such strength as may be necessary to obtain the desired grade. The sulphuric acid reacts on the oil forming sulpho-acids and other bodies commonly known as acid sludge. The chemical reaction may be expressed as—

The chemical reaction shown illustrates only one type of many that may exist.

This treatment has usually heretofore been carried out in agitators where the required amount of sulphuric acid is added and brought into contact with the oil by air agitation. I designate such prior method as the batch system.

By the aforesaid batch method it requires from ½ to 1 hour to commingle the oil with the acid. Thus the water as it is formed, due to the chemical reaction, dilutes and decreases the strength of the remaining and incoming acid. The batch treatment is customarily carried on at 190° to 200° F. temperature.

We have discovered that the quantity of acid necessary to refine a lamp oil petroleum distillate varies in accordance with the period of contact and with the temperature of the distillate. The heating of the distillate to be treated will increase the speed of the reaction between the oil and acid. But if a prolonged contact between the oil and the acid is permitted a decomposing reaction will take place. The decomposition reaction may be expressed as—

The decomposition reaction must be counteracted in the batch system by the use of additional acid.

By means of our continuous process as hereafter described we utilize a heating of the distillate to be treated but permit a contact between the oil and the acid only sufficient in time to thoroughly commingle the acid. Our process thus employs heat to reduce the quantity of acid required and coincident therewith eliminates the continuance of a decomposing reaction, (which would otherwise necessitate the employment of additional acid) by immediately cooling said products of reaction.

In the accompanying drawing we have illustrated diagrammatically one form of apparatus by which our invention may be employed.

Referring to the drawing 2 indicates a storage tank for the oil to be treated. The oil passes from the tank 2 through a pipe 3 and into the suction end of a pump 4. The oil is discharged from the pump 4 through a pipe 5 into a heater 6, where the oil is heated until the temperature thereof stands approximately 200° F. 7 indicates a steam pipe communicating with the heater 6.

The heated oil leaves the heater 6 through a pipe 9 where it meets the incoming acid from a pipe 10 which is connected to the line 9 by means of a T or Y.

The pipe 9 is connected with a pair of mixers 11 in which the heated oil and acid are commingled. The pressure within the system is regulated so that the time of contact between the oil and acid within the mixers 11 is between 30 to 60 seconds.

The acid treated oil and acid sludge pass from the mixers 11 by a pipe 13 to a cooler 14. The cooler 14 may be of any well known commercial construction, such as a coil pipe surrounded by water. In the type of cooler 14 illustrated in the drawing, the commingled oil and acid pass from the pipe 13 through a coil pipe (not shown) contained in the cooler 14, and passes out through a pipe 16 and is thereafter finished by well known methods. Water is introduced to the cooler 14 through a pipe 15 and circulates therein, and passes therefrom through a pipe 17.

The point in the system at which the oil is heated is not material. The mixer 11 is preferably provided with a jacket which may be used as a cooling jacket. In the mixers 11 the oil and acid are commingled. The heat produced by the chemical reaction between the oil and acid is conducted away as fast as it is liberated by means of cold water, which flows through the water jackets 12.

For example:—

The oil to be treated should be heated to approximately 200° F. before entering the mixer 11, and in the mixer 11 the heat of reaction generated by contact of the oil with the acid should be extracted by cold water in the jackets 12 so that the temperature of the products leaving the mixer is maintained so near substantially the temperature of the oil entering the mixer that the products leaving the mixer do not exceed a temperature of 215° F. Removing the heat of reaction as the same is generated when the temperature tends to exceed 215° F. will prevent the decomposition action and by thereafter immediately further cooling the products the decomposing reaction can be substantially prevented and the oil treated with a minimum amount of acid.

From the above it may be readily seen that our invention permits the oil to be heated for the purpose of reducing the amount of acid employed by speeding up the reaction and prevents the counteracting of such saving by conducting away the heat of the reactions as the same is liberated and by passing the products from the zone of reaction and cooling before appreciable decomposing reaction can take place.

We have discovered that sulphuric acid which contains 15% of sulphuric anhydride ($SO_3$) may be employed to advantage in our process. The use of such "fuming sulphuric acid" increases the heat and consequently the speed of the reaction as indicated thereby effecting a further saving of acid.

It is thus seen that if the treated oil, so commingled with acid, is retained at a temperature below that at which such decomposing reaction takes place, or is cooled substantially immediately upon the reaction of the acid upon the oil, the decomposing reaction is substantially avoided.

We claim:

1. The process of treating lamp oil distillates with sulphuric acid, which comprises heating the oil to a temperature approximately 200° F. continually forcing together the oil and acid in a conduit closed from access to the atmosphere, and conducting away the heat of reaction from the intermingled oil and acid at a rate sufficient to maintain the mixture at approximately 215° F.

2. A continuous process of treating lamp oil distillates with sulphuric acid which comprises heating the oil to a temperature approximately 200° F. forcing together oil and acid under pressure into a conduit closed from access to the atmosphere, and conducting away the heat of the reactions during the passage of the oil and acid through said conduit at a rate sufficient to maintain the mixture at approximately 215° F., and the treating time being between 30 and 60 seconds, and then immediately cooling the reaction products to avoid a decomposing reaction.

3. The process of treating lamp oil distillates with sulphuric acid which consists in commingling the oil and fuming sulphuric acid under pressure in the conduit at a temperature of substantially 200° F., conducting away the heat of reaction in the conduit at a rate sufficient to maintain the mixture at a temperature approximately 215° F., the treating reaction being carried out for a period of time approximately 30 to 60 seconds, and immediately cooling the reaction products after the reaction is completed to avoid a decomposing reaction.

4. A continuous process of treating those lamp oil distillates with sulphuric acid which during the treatment evolves such a heat of reaction as tends to raise the mass to a temperature of more than over 15° higher than the temperature of the oil before treatment, which consists in heating said oil to a temperature approximately 200° F. forcing together such oil and fuming sulphuric acid under pressure into and through a conduit closed from direct access to the atmosphere for a period of time between 30 and 60 seconds, and conducting away the heat of the reaction from intermingled oil and acid as generated at such a rate that the oil leaving the conduit does not exceed a temperature of over 15° higher than the temperature of the entering oil.

Signed at Richmond, California, this 13th day of January 1920.

RICHARD W. HANNA.
JOSEPH F. BROOKS.

Witnesses:
W. D. MASON,
H. M. FLINT.